(12) United States Patent
Ham et al.

(10) Patent No.: US 10,845,632 B2
(45) Date of Patent: Nov. 24, 2020

(54) DISPLAY APPARATUS

(71) Applicant: LG Display Co., Ltd., Seoul (KR)

(72) Inventors: Sungsu Ham, Bucheon-si (KR); YeongRak Choi, Bucheon-si (KR); Sungtae Lee, Bucheon-si (KR); Daeho Kim, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/130,073

(22) Filed: Sep. 13, 2018

(65) Prior Publication Data

US 2019/0129231 A1 May 2, 2019

(30) Foreign Application Priority Data

Oct. 31, 2017 (KR) .................. 10-2017-0144242

(51) Int. Cl.
*G02F 1/1333* (2006.01)
*H04R 9/02* (2006.01)
*G09G 3/34* (2006.01)
*H04R 7/04* (2006.01)
*H04R 19/02* (2006.01)
*H04R 1/02* (2006.01)

(52) U.S. Cl.
CPC ..... *G02F 1/133308* (2013.01); *G09G 3/3486* (2013.01); *H04R 7/045* (2013.01); *H04R 9/02* (2013.01); *G09G 2310/0264* (2013.01); *H04R 1/028* (2013.01); *H04R 19/02* (2013.01)

(58) Field of Classification Search
CPC .......... H04R 9/02; H04R 9/025; H04R 9/047; H04R 9/063; H04R 1/028; H04R 19/02; H04R 2499/15; H04R 7/04; H04R 7/045; H04R 7/06; H04R 2499/11; G02F 1/133308; G09G 3/3486; G09G 2310/0264
See application file for complete search history.

(56) References Cited

U.S. PATENT DOCUMENTS 6,480,614 B1 * 11/2002 Denda ................. H04R 7/04
381/191
7,912,239 B2 * 3/2011 Nishimura ............ H04R 9/06
381/396

(Continued)

FOREIGN PATENT DOCUMENTS

CN 1262857 A 8/2000
CN 1325188 A 12/2001
(Continued)

OTHER PUBLICATIONS

First Notification of Office Action dated Apr. 13, 2020, issued in corresponding Chinese Patent Application No. 201811107311.2.
(Continued)

*Primary Examiner* — Jason R Kurr
(74) *Attorney, Agent, or Firm* — Morgan, Lewis & Bockius LLP (57) ABSTRACT

A display apparatus includes a display panel configured to display an image; a supporting member on a rear surface of the display panel; a magnetic circuit unit in the supporting member, the magnetic circuit unit configured to generate a magnetic loop; and a coil unit on the rear surface of the display panel. The magnetic circuit unit and the coil unit are configured to vibrate the display panel to generate sound.

23 Claims, 6 Drawing Sheets

(56) References Cited

U.S. PATENT DOCUMENTS

| | | | |
|---|---|---|---|
| 8,934,228 B2 * | 1/2015 | Franklin | G06F 1/1652 361/679.26 |
| 10,356,529 B2 * | 7/2019 | Hui | H04R 7/18 |
| 2001/0048256 A1 | 12/2001 | Miyazaki et al. | |
| 2002/0065113 A1 * | 5/2002 | Mori | H04M 1/0266 455/567 |
| 2007/0076915 A1 * | 4/2007 | Shin | H04R 7/04 381/400 |
| 2009/0097692 A1 * | 4/2009 | Sakamoto | H04R 7/045 381/388 |
| 2010/0119101 A1 * | 5/2010 | Fratti | H04R 7/045 381/388 |
| 2019/0238986 A1 * | 8/2019 | Ikeuchi | H04R 7/04 |

FOREIGN PATENT DOCUMENTS

| | | |
|---|---|---|
| CN | 1356779 A | 7/2002 |
| CN | 1891009 A | 1/2007 |
| CN | 202663535 U | 1/2013 |
| CN | 103416043 A | 11/2013 |

OTHER PUBLICATIONS

Second Notification of Office Action dated Sep. 29, 2020, issued in corresponding Chinese Patent Application No. 201811107311.2. Note: CN1356779 A and CN1325188 A are already of record.

\* cited by examiner

DISPLAY APPARATUS

CROSS-REFERENCE TO RELATED APPLICATIONS

This application claims the benefit of and priority to Korean Patent Application No. 10-2017-0144242, filed on Oct. 31, 2017, the entirety of which is hereby incorporated by reference.

BACKGROUND

Technical Field

The present disclosure relates to a display apparatus, and more particularly, to a display apparatus for vibrating a display panel to generate sound.

Discussion of the Related Art

With the advancement of an information-oriented society, various desires for display technology to express information in accordance with an electrical information signal have increased. Thus, research is being conducted on various display apparatuses that have a thin profile, light weight, and low power consumption. For example, a display apparatus may include a liquid crystal display (LCD) apparatus, a field emission display (FED) apparatus, an organic light-emitting display (OLED) apparatus, etc.

Among the above display apparatus, the LCD apparatus may include an array substrate including a thin film transistor (TFT), an upper substrate including a color filter and/or a black matrix, and a liquid crystal layer between the array substrate and the upper substrate. An alignment state of the liquid crystal layer is controlled based on an electric field applied to two electrodes of a pixel region, whereby light transmittance is adjusted based on the alignment state of the liquid crystal layer, thereby displaying an image.

The OLED apparatus, which is a self-light emitting display apparatus, has advantages of a fast response time, high light-emitting efficiency, high luminance, and a wide viewing angle in comparison with other display apparatuses, and thus, are attracting much attention.

A display apparatus may display an image on a display panel while an additional speaker for supplying sound has to be provided. If the speaker is provided in a display apparatus, the sound generated in the speaker advances toward a lower or rear portion of the display panel instead of a front portion of the display panel. Thus, the sound does not advance toward a user who watches the image displayed on the display panel so that a user's immersion experience is reduced. In addition, as the sound generated in the speaker advances toward the lower or rear portion of the display panel, sound quality is deteriorated due to interference with sound reflected from the wall or floor.

Furthermore, if the speaker is included in a set apparatus, such as television (TV), the speaker occupies a space that may impose a restriction on design and a spatial disposition of the set apparatus. Moreover, if the speaker is included in a set apparatus, such as television (TV), a thickness is increased due to a size of the speaker.

SUMMARY

Accordingly, embodiments of the present disclosure are directed to a display apparatus that substantially obviates one or more of the problems due to limitations and disadvantages of the related art.

Therefore, the inventors have recognized the above-described problems and have performed various experiments so that, when watching an image in a front portion of a display panel, a traveling direction of sound becomes a direction toward a front portion of the display panel. Thus, sound quality is enhanced. Through the various experiments, the inventors have invented a display apparatus having a new structure, which facilitates to output sound so that a traveling direction of sound becomes a direction toward a front portion of a display panel, thereby enhancing sound quality.

Moreover, the inventors have recognized that when a sound generation device is provided on a rear surface of a display panel, there is a limitation in decreasing a size of the sound generation device. Therefore, the inventors have performed various experiments, and thus, have invented a display apparatus including a sound generation device having a new structure, in which a thickness of the sound generation device is reduced.

An aspect of the present disclosure is to provide a display apparatus including a sound generation device for generating sound which travels to a front portion of a display panel.

Another aspect of the present disclosure is to provide a display apparatus including a sound generation device, in which a size of the sound generation device is reduced.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described herein, a display apparatus comprises a display panel configured to display an image; a supporting member on a rear surface of the display panel; a magnetic circuit unit in the supporting member, the magnetic circuit unit configured to generate a magnetic loop; and a coil unit on the rear surface of the display panel, wherein the magnetic circuit unit and the coil unit are configured to vibrate the display panel to generate sound.

In another aspect, a display apparatus comprises a display panel configured to display an image; a supporting member on a rear surface of the display panel; a coil unit between the display panel and the supporting member; and a magnetic circuit unit between the display panel and the supporting member, wherein the coil unit defines a plane parallel to the display panel, and wherein a driving force between the magnetic circuit unit and the coil units is configured to vibrate the display panel to generate sound.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the inventive concepts as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION

Reference will now be made in detail to embodiments of the present disclosure, examples of which may be illustrated in the accompanying drawings. In the following description, a detailed description of functions or configurations related to this document that are well-known to those skilled in the art may be omitted. The progression of processing steps and/or operations described is an example. The sequence of steps and/or operations is not limited to that set forth herein and may be changed as is known in the art or apparent to those skilled in the art, with the exception of steps and/or operations necessarily occurring in a particular order. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms like "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

In the present disclosure, examples of a display apparatus are used to encompass a display apparatus, such as an organic light emitting display module (OLED module) or a liquid crystal module (LCM), that includes a display panel and a driving unit for driving the display panel. And, the display apparatus is used to further encompass a set device (or a set apparatus) or a set electronic apparatus, as a finished product, such as a notebook computer or a laptop computer, a television set, a computer monitor, an equipment apparatus (e.g., display equipment in an automotive apparatus or another type of vehicle apparatus) or a mobile electronic apparatus that is a complete product or a final product (for example, a smartphone or an electronic pad, etc.) that includes the LCM or the OLED module.

Therefore, in the present disclosure, the display apparatus may refer to both a display apparatus itself, such as the LCM or the OLED module, and also a set apparatus that is a final consumer apparatus or an application product including the LCM or the OLED module.

Moreover, in some examples, the LCM or the OLED module, including a display panel and a driving unit thereof may be referred to as a display apparatus, and the electronic apparatus as a final product including the LCM or the OLED module may be referred to as a set apparatus. For example, the display apparatus may include a display panel, such as an LCD or an OLED, and a source printed circuit board (PCB) as a controller for driving the same, and the set apparatus may further include a set PCB that is a set controller set to be electrically connected to the source PCB and to control the overall operations of the set apparatus.

A display panel used for an embodiment of the present disclosure may be any type of display panel, for example without limitation, a liquid crystal display panel, an organic light emitting diode (OLED) display panel, and an electroluminescent display panel, etc. For example, the display panel may be any panel capable of generating sound in accordance with a vibration by a sound generation device. The display panel according to an embodiment of the present disclosure is not limited in its shape or size.

For example, if the display panel is the liquid crystal display panel, the display panel may include a plurality of gate lines, a plurality of data lines, and a plurality of pixels respectively provided in a plurality of pixel areas of the gate lines and the data lines. The display panel may include an array substrate including a thin film transistor (TFT) which is a switching element for controlling a light transmittance of each of the plurality of pixels, an upper substrate including a color filter and/or a black matrix, and a liquid crystal layer between the array substrate and the upper substrate.

If the display panel is the organic light emitting display panel, the display panel may include a plurality of gate lines, a plurality of data lines, and a plurality of pixels respectively provided in a plurality of pixel areas of the gate lines and the data lines. The display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent moisture or oxygen from penetrating into the organic light emitting device layer. Also, a layer on the array substrate may include an inorganic light emitting layer (for example, a nano-sized material layer or the like).

The display panel may further include a backing, such as a metal plate attached to the rear surface of the display panel, but embodiments are not limited to the metal plate. An alternative structure, for example, formed of a different material, may be provided.

The display panel including the sound generation device according to an embodiment of the present disclosure may be implemented at a user interface module in a vehicle, such as a central control panel area in an automobile. For example, such a display panel may be configured between two front seat occupants such that sounds due to vibrations of the display panel propagate towards the interior cabin of the vehicle. As such, the audio experience in a vehicle can be improved in comparison with having speakers at the interior sides or edges of the vehicle.

Hereinafter, a display apparatus according to example embodiments will be described in detail with reference to the accompanying drawings.

Figure 1:
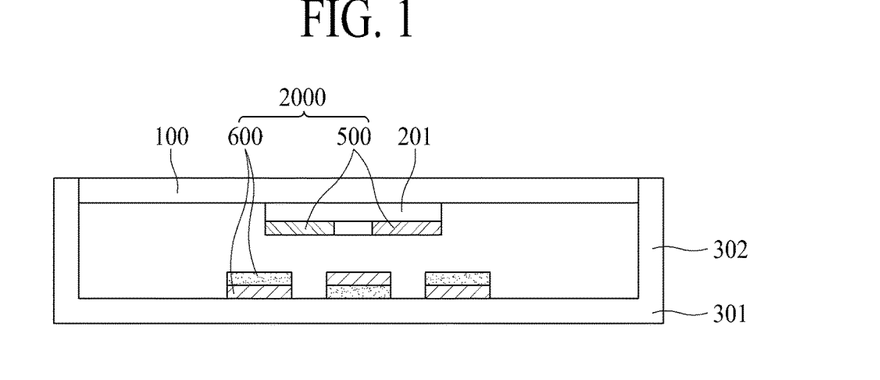
FIG. 1 illustrates a display apparatus including a sound generation device according to an embodiment of the present disclosure.

FIG. 1 illustrates a display apparatus including a sound generation device according to an embodiment of the present disclosure.

With reference to FIG. 1, the display apparatus may include a display panel 100 which displays an image and a sound generation device 2000, which vibrates the display panel 100 to generate a sound. The sound generation device 2000 may be referred to as an "actuator," an "exciter," or a "transducer."

The display panel 100 may be a liquid crystal display panel, a light emitting display panel, or a flexible light emitting display panel. The display panel 100 according to an embodiment of the present disclosure may include a pixel array substrate, including a pixel array including a plurality of pixels, and an encapsulation layer which encapsulates the pixel array.

The display panel 100 may display an image in a type, such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a front portion of the pixel array substrate to allow an image to be displayed, and in the bottom emission type, the visible light emitted from the pixel array layer may be irradiated onto a rear portion of the pixel array substrate to allow an image to be displayed.

The plurality of pixels may be respectively provided in a plurality of pixel areas by a plurality of pixel driving lines. Also, each of the plurality of pixels may include a pixel circuit, including at least two thin film transistors (TFTs) and at least one capacitor, and a light emitting device that emits light with a current supplied from the pixel circuit. For example, the light emitting device may include an organic light emitting layer or a quantum dot light emitting layer. As another example, the light emitting device may include a micro light emitting diode (LED).

The encapsulation layer may protect the TFTs and the light emitting device from an external impact, and may prevent moisture from penetrating into the light emitting device. Alternatively, the encapsulation layer may be replaced or supplemented with an encapsulation substrate that is attached to the pixel array substrate by a filler surrounding the pixel array. If the filler is a transparent filler, the encapsulation substrate may be a transparent encapsulation substrate.

The display apparatus may further include a polarization film in the display panel 100. The polarization film may circularly polarize external light reflected by the TFTs and/or the pixel driving lines on the pixel array substrate, thereby enhancing the visibility and contrast ratio of the display panel 100.

Moreover, the display apparatus may further include a color filter layer that is provided on an upper surface of the encapsulation layer of the display panel 100. The color filter layer may include a color filter that overlaps a corresponding pixel of the plurality of pixels and transmits only a wavelength of a color set in the corresponding pixel of the plurality of pixels.

The display panel 100 may be a liquid crystal display panel. This example arrangement will be described below.

The display panel 100 may include a first substrate, a second substrate, and a liquid crystal layer. The first substrate may include a pixel electrode or a common electrode for controlling alignment of liquid crystal molecules of the liquid crystal layer, and may include a TFT connected to the pixel electrode. The second substrate may include the color filter layer for realizing display of a color image.

The display panel 100 may drive the liquid crystal layer with an electric field generated from a data voltage and a common voltage that are applied to each of the pixels to control light transmittance of the liquid crystal layer to display an image. The liquid crystal layer may be driven in various driving modes, such as a twisted nematic (TN) mode, a vertical alignment (VA) mode, an in-plane switching (IPS) mode, and a fringe field switching (FFS) mode.

For example, the first substrate may be a TFT substrate, and may include the plurality of pixels defined by a plurality of gate lines and a plurality of data lines that intersect one another. Each of the pixels may include a TFT connected to a corresponding gate line and a corresponding data line, a pixel electrode connected to the TFT, and a common electrode that is disposed adjacent to the pixel electrode and is supplied with the common voltage. The common electrode may be provided on the second substrate, based on a driving mode of the liquid crystal layer. A driving circuit unit for driving the display panel 100 and the pad part connected to the driving circuit unit may be disposed on one side of the first substrate. The second substrate may be a color filter array substrate and may include the color filter layer. In a case where the display panel 100 is driven in a color filter on TFT (COT) mode or a TFT on color filter (TOC) mode, the color filter layer may be provided on the first substrate.

A backlight unit may be under the display panel 100, and may irradiate light onto the display panel 100. The display panel 100 may control transmittance of the light emitted from the backlight unit to display an image.

The display apparatus may be a display module that includes the display panel 100 and the driving circuit unit for driving the display panel 100. For example, the driving circuit unit may include an integrated circuit (IC) chip and/or a flexible printed circuit board (FPCB). The driving circuit unit, such as a driving IC, for applying a voltage may be mounted on the FPCB. Alternatively, the driving circuit unit may be implemented in a different type, such as a chip-on-film (COF) type or a chip-on-glass (COG) type.

The gate lines and the data lines of the display panel 100 may be connected to the FPCB. When an electrical signal is applied from the FPCB, the electrical signal may be applied to a source electrode and a drain electrode of the TFT. The FPCB may receive an image signal from the outside of the display panel 100 to apply a driving signal to the gate lines and the data lines of the display panel 100.

The FPCB may generate a gate signal and a data signal for driving the display panel 100, and a plurality of timing signals that allow the gate signal and the data signal to be applied at an appropriate time. The FPCB may apply the gate signal and the data signal to the gate lines and the data lines of the display panel 100. Also, the FPCB may include an amplifier.

A cover window may be provided on the display module. The cover window may be attached to a whole surface of the display module or a whole surface of the polarization film.

The driving circuit unit may be on a rear surface of a supporting member 301. The driving circuit unit may generate an image signal and may supply the image signal to each of the plurality of pixels in the display panel 100, thereby allowing the display panel 100 to display an image. The driving circuit unit may generate a voice signal, based on an audio source and may amplify the voice signal to generate a vibration driving signal, thereby vibrating the sound generation device 2000.

The display apparatus may include the sound generation device 2000 and the supporting member 301. The supporting member 301 may support one or more of a rear surface and a side surface of the display panel 100. In the present disclosure, the supporting member 301 may be, for example, a cover bottom. Alternatively, the supporting member 301 may further include a second supporting member 302, such as a middle cabinet that is coupled or connected to the cover bottom, surrounds the side surface of the display panel 100, accommodates one periphery of the display panel 100, and supports the display panel 100. For example, the middle cabinet may include a ㅗ-shaped (or T-shape at a 90-degree angle) cross-sectional surface. The supporting member 301 may include a cover bottom, or may include a cover bottom and a middle cabinet, but embodiments are not limited thereto. For example, the supporting member 301 may include a structure that covers the rear surface or the side surface of the display panel 100.

The supporting member 301 and the second supporting member 302 may surround a whole side surface and rear surface of the display apparatus, thereby protecting the display apparatus. The supporting member 301 and the second supporting member 302 may have rigidity that is relatively stronger in comparison with weight. Accordingly, the supporting member 301 and the second supporting member 302 may protect the display apparatus without any increase in weight of the display apparatus. Moreover, the supporting member 301 may be a plate member provided over the rear surface of the display panel 100, or all over the display panel 100.

The supporting member 301 or the second supporting member 302 may be referred to as a "cover bottom," a "plate bottom," a "back cover," a "base frame," a "metal frame," a "metal chassis," a "chassis base," or an "m-chassis." Therefore, the supporting member 301 or the second supporting member 302 may be a supporter for supporting the display panel 100, and may be implemented as any type of frames or a plate structure, and may be on the rear surface of the display apparatus.

The supporting member 301 may cover the whole rear surface of the display panel 100 so as to be spaced apart from the rear surface and may have a plate shape formed of one or more of: a glass material, a metal material, and a plastic material. Here, a periphery or a sharp corner portion of the supporting member 301 may have a slope shape or a curved shape, e.g., by a trimming or chamfering process or a corner rounding process. According to an embodiment of the present disclosure, the supporting member 301 including the glass material may include sapphire glass. For example, the supporting member 301 including the metal material may be formed of one or more of: aluminum (Al), an Al alloy, a magnesium (Mg) alloy, and an iron (Fe)-nickel (Ni) alloy. As another example, the supporting member 301 may have a stacked structure including a glass plate, which has a thickness relatively thinner than a metal plate and a glass plate and faces the rear surface of the display panel 100. The second supporting member 302 may be formed of a material (for example, a glass material, a metal material, or a plastic material) that is the same as that of the supporting member 301.

An adhesive member may be between the display panel 100 and the supporting member 301. The display panel 100 may be attached to the supporting member 301 by the adhesive member. The adhesive member may be a double-sided tape, a single-sided tape, an adhesive, and/or a bond, but embodiments are not limited thereto.

With reference to FIG. 1, the sound generation device 2000 may be between the display panel 100 and the supporting member 301. The sound generation device 2000 may include at least one coil unit 500 and at least one magnetic circuit unit 600. The magnetic circuit unit 600 may be in parallel with the display panel 100. When two magnetic circuit units 600 are on both sides corresponding to a direction vertical to the display panel 100 to face each other, for example, when the two magnetic circuit units 600 are disposed to face each other in the direction vertical to the display panel 100, the inventors have recognized that it is difficult to dispose the two magnetic circuit units 600 on a rear surface of the display panel, and one of the two magnetic circuit units should be disposed outside a front portion of the display panel. Also, when two magnetic circuit units 600 are disposed on both sides to face each other in a lengthwise direction and a coil unit 500 is provided between the two magnetic circuit units 600 disposed in the lengthwise direction, the inventors have recognized that an area occupied by the two magnetic circuit units 600 and the coil unit 500 increases, and due to this, it is difficult to miniaturize a sound generation device. Also, when two magnetic circuit units are disposed on both sides to face each other in a lengthwise direction and a coil unit 500 is provided between the two magnetic circuit units 600 disposed in the lengthwise direction, the inventors have recognized that the coil 500 unit for driving a display panel 100 is unable to drive in a vertical direction. Therefore, the inventors have implemented a sound generation device that is miniaturized by disposing a magnetic circuit unit 600 in parallel with a display panel.

With reference to FIG. 1, a coil unit 500 and a magnetic circuit unit 600 may be between the display panel 100 and the supporting member 301. For example, the coil unit 500 may be on a circuit board 201 on the rear surface of the display panel 100. The circuit board 201 may be a PCB or an FPCB, but embodiments are not limited thereto.

The magnetic circuit unit 600 may be in the supporting member 301. A pair of magnetic circuit units 600 including an N-pole magnet and an S-pole magnet may be provided and may be alternately disposed. Also, the pair of magnetic circuit units 600 may be provided with the coil unit 500 therebetween and may be respectively disposed on both sides of the coil unit 500. Also, the magnetic circuit unit 600 may be disposed in parallel with the display panel 100, thereby miniaturizing the sound generation device 2000.

The magnetic circuit unit 600 may have a polarity opposite to that of an adjacent magnetic circuit unit, and the magnetic circuit unit 600 and the adjacent magnetic circuit unit may be provided as one pair. Also, the magnetic circuit unit 600 and the adjacent magnetic circuit unit may be disposed to have opposite polarities. For example, each of two or more magnetic circuit units 600 may be disposed to have a polarity opposite to that of an adjacent magnetic circuit unit. Also, the magnetic circuit unit 600 may be spaced apart from the adjacent magnetic circuit unit by a particular distance, and the particular distance may be set as interval distance that enables a magnetic flux density to be maximally obtained at a position of the coil unit 500.

The coil unit 500 may be disposed in parallel with the magnetic circuit unit 600. Accordingly, the sound generation device 2000 is miniaturized. Moreover, the coil unit 500 may be provided in plurality, and the at least one coil unit 500 may be between one or more magnetic circuit units 600. For example, the at least one coil unit 500 may be between two or more magnetic circuit units 600. Also, the at least one coil unit 500 may be disposed in correspondence with two or more magnetic circuit units 600. Also, one or more coil units 500 may be arranged as a zigzag type. For example, one or more coil units 500 may be arranged as a zigzag type in a center of each of the plurality of magnetic circuit units 600.

The magnetic circuit unit 600 may be disposed to have a polarity opposite to that of the coil unit 500. Also, the magnetic coil unit 600 corresponding to one coil unit 500 may be provided in plurality. Also, the coil unit 500 may include two magnetic pairs in opposite directions (for example, directions of currents), and thus, may have a magnetic pair where the directions of the currents are symmetrical. For example, a coil unit 500 corresponding to three magnetic circuit units 600 may be configured with a magnetic pair where directions of currents are symmetrical. Also, the coil unit 500 may be configured with two magnetic pairs, based on three magnetic circuit units 600. Also, one coil unit 500 may be disposed to share three magnetic circuit units 600.

Moreover, three magnetic circuit units 600 and one coil unit 500 may be provided as one structure. The display panel 100 may be vibrated by the one structure to generate sound. Therefore, when three magnetic circuit units 600 and one coil unit 500 are provided as one structure, the one structure may be disposed in each of a left region and a right region of the rear surface of the display panel 100, or may be disposed in each of an upper region and a lower region of the rear surface of the display panel 100. In this case, a 2.0-channel sound may be output to a front portion of the display panel 100. For example, sound having a middle-high-pitched sound band may be output. Here, a middle-pitched sound band may be 200 Hz to 3 kHz, and a high-pitched sound band may be 3 kHz or more. However, the embodiments are not limited thereto. Also, a low sound speaker may be provided in a center region of the display panel 100, for outputting a low-pitched sound. When the low sound speaker is provided in the center region of the display panel 100, a low-pitched sound band may be 400 Hz to 1 kHz, but embodiments are not limited thereto. Also, when the low sound speaker is provided under the display panel 100, the low-pitched sound band may be 200 Hz or less, but embodiments are not limited thereto. Accordingly, when the low sound speaker is provided, a 2.1-channel sound may be output to the front portion of the display panel 100.

Moreover, when three magnetic circuit units 600 and one coil unit 500 are provided as one structure and the one structure is disposed in each of the left region and the right region or the upper region and the lower region of the rear surface of the display panel 100, a partition may be between structures in the left region and the right region or the upper region and the lower region. The partition may be an air gap or a space where sound is generated when the display panel 100 is vibrated by the structure. An air gap or a space that generates or transfers sound may be referred to as a partition. A partition may be referred to as an "enclosure" or a "baffle," but embodiments are not limited these terms. Sounds having different middle-high-pitched sound bands may be output from the left region and the right region, or the upper region and the lower region, and a stereo sound may be output through left-right sound separation or up-down sound separation. The partition may be formed of polyurethane, polyolefin, polyethylene, and/or the like, but embodiments are not limited thereto. Also, the partition may include a single-sided tape, a double-sided tape, an adhesive, a bond, and/or the like, and for example, may be formed of a material having elasticity that may be compressed to some extent.

Moreover, the display panel 100 may be vibrated by the sound generation device 2000 including the magnetic circuit unit 600 and the coil unit 500 to output sound to a front portion of the display panel 100. Also, the sound generation device 2000 according to an embodiment of the present disclosure may use the display panel 100 as a vibration plate, and thus, may generate sound even without including a separate vibration plate.

Figure 2A:
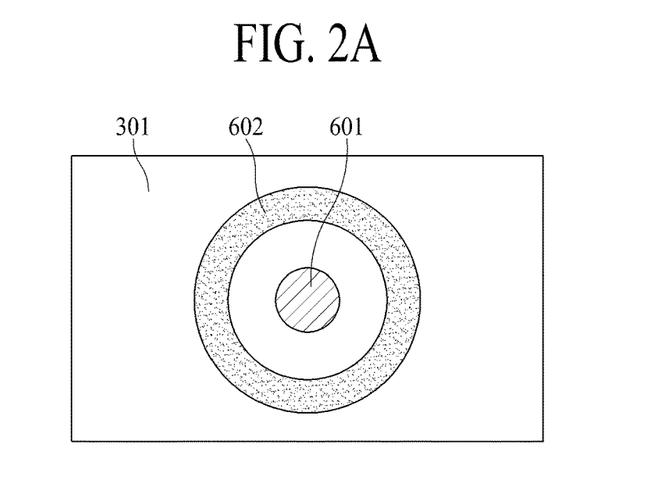
FIGS. 2A and 2B illustrate a magnetic circuit unit and a coil unit of FIG. 1.
Figure 2B:
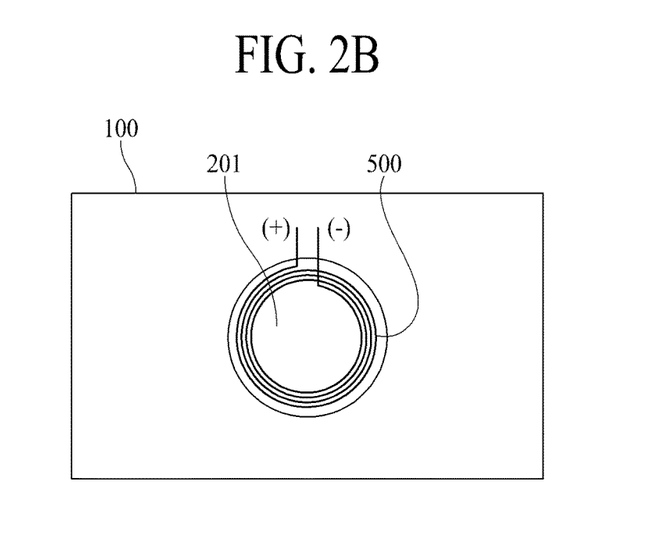

FIGS. 2A and 2B illustrate the magnetic circuit unit 600 and the coil unit 500 of FIG. 1.

With reference to FIG. 2A, the magnetic circuit unit 600 may be in the supporting member 301. The magnetic circuit unit 600 may include a first magnetic circuit unit 601 and a second magnetic circuit unit 602. For example, the first magnetic circuit unit 601 may be an inner magnetic circuit unit and may be an N-pole of a magnet. Also, the second magnetic circuit unit 602 may be an outer magnetic circuit unit and may be an S-pole of the magnet. Also, the first magnetic circuit unit 601 may be a circular magnet, and the second magnetic circuit unit 602 may be a ring magnet. However, embodiments are not limited thereto. Therefore, an intensity of a magnetic force (for example, a magnetic force) may be enhanced, and thus, sound may be enhanced. Also, the magnet may be implemented, e.g., with a sintered magnet, such as barium ferrite. A material of the magnet may include one or more of: ferric oxide ($Fe_2O_3$), barium carbonate (or witherite) ($BaCO_3$), a neodymium (Nd) magnet, strontium ferrite ($Fe_{12}O_{19}Sr$), e.g., with an improved magnet component, an alloy cast magnet including aluminum (Al), nickel (Ni), and cobalt (Co), and/or the like, but embodiments are not limited these examples. As another example, the neodymium magnet may be neodymium-iron-boron (Nd—Fe—B). However, embodiments are not limited these examples.

With reference to FIG. 2B, the coil unit 500 may be configured as a type where positive polarity '+' and negative polarity '−' are alternately wound around the circuit board 201. The circuit board 201 may be a PCB or an FPCB, but embodiments are not limited thereto. Also, the coil unit 500 may be configured with a spiral type flat coil. Accordingly, a sound generation device may be miniaturized.

Figure 3A:
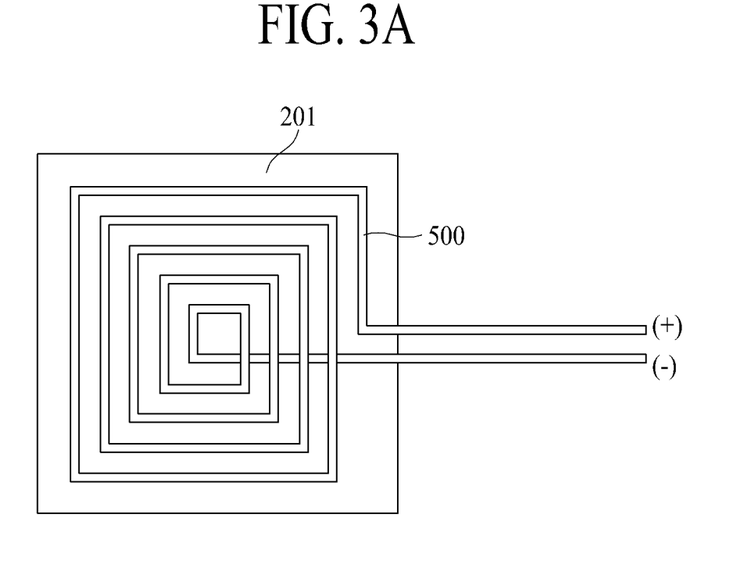
FIGS. 3A and 3B illustrate a coil unit according to another embodiment of the present disclosure.
Figure 3B:
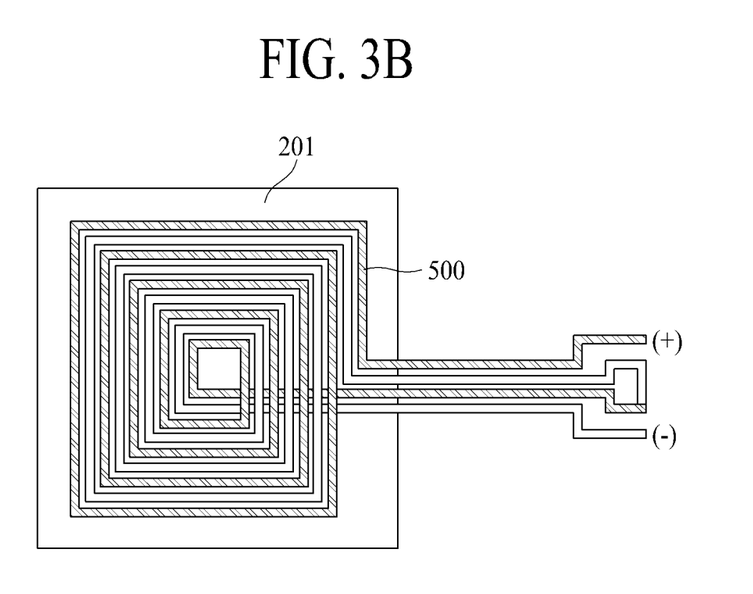

FIGS. 3A and 3B illustrate a coil unit according to another embodiment of the present disclosure.

With reference to FIG. 3A, a coil unit 500 may be configured as a single winding type where positive polarity '+' and negative polarity '−' are alternately wound on a circuit board 201. The circuit board 201 may be a PCB or an FPCB, but embodiments are not limited thereto.

With reference to FIG. 3B, a coil unit 500 may be configured as a multi-winding type where positive polarity '+' and negative polarity '−' are alternately wound around a circuit board 201. The circuit board 201 may be a PCB or an FPCB, but embodiments are not limited thereto. Accordingly, a density of a current of a coil unit may be enhanced, and thus, a magnetic force may be enhanced.

The coil unit 500 illustrated in FIGS. 3A and 3B may be configured with a spiral type flat coil described above with reference to the FIG. 2B example. Also, the coil unit 500 may be configured to have a circular or tetragonal shape.

Figure 4:
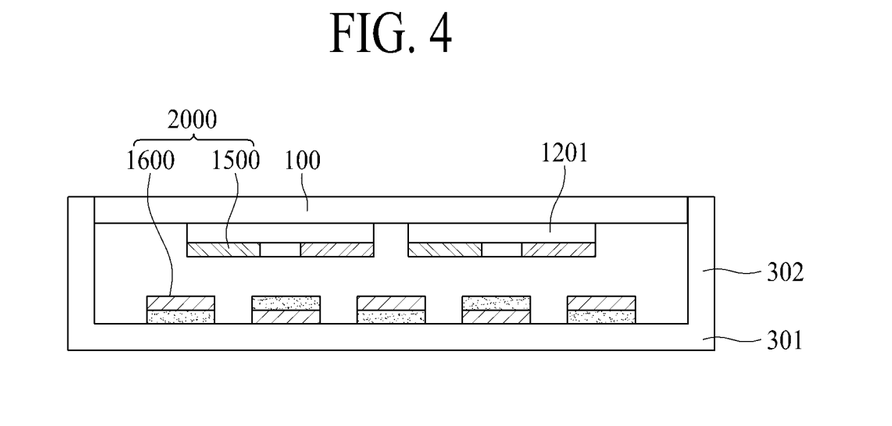
FIG. 4 illustrates a display apparatus according to another embodiment of the present disclosure.

FIG. 4 illustrates a display apparatus according to another embodiment of the present disclosure.

With reference to FIG. 4, a sound generation device 2000 may be between a display panel 100 and a supporting member 301. The sound generation device 2000 may include a coil unit 1500 and a magnetic circuit unit 1600. The coil unit 1500 may be on a rear surface of the display panel 100. For example, the coil unit 1500 may be on a circuit board 1201 of the display panel 100. The circuit board 1201 may be a PCB or an FPCB, but embodiments are not limited thereto. Description given above with reference to FIG. 2B may be applied to the coil unit 1500. Also, as described above with reference to FIGS. 3A and 3B, the coil unit 1500 may have opposite polarities '+' and '−' and may be configured as a one or more-winding type.

The magnetic circuit unit 1600 may be in a supporting member 301. A pair of magnetic circuit units 1600 including an N-pole magnet and an S-pole magnet may be provided and may be alternately disposed. Also, the pair of magnetic circuit units 1600 may be provided with the coil unit 1500 therebetween and may be respectively disposed on both sides of the coil unit 1500.

The magnetic circuit unit 1600 may have a polarity opposite to that of an adjacent magnetic circuit unit 1600, and the magnetic circuit unit 1600 and the adjacent magnetic circuit unit 1600 may be provided as one pair. Also, the magnetic circuit unit 1600 and the adjacent magnetic circuit unit may be disposed to have opposite polarities. For example, each of two or more magnetic circuit units 1600 may be disposed to have a polarity opposite to that of an adjacent magnetic circuit unit 1600. Also, the magnetic circuit unit 1600 may be spaced apart from the adjacent magnetic circuit unit by a particular distance, and the particular distance may be set as a distance that enables a magnetic flux density to be maximally obtained at a position of the coil unit 1500.

The coil unit 1500 may be disposed parallel to the magnetic circuit unit 1600. Accordingly, the sound generation device 2000 is miniaturized.

Moreover, the coil unit 1500 may be provided in plurality, and the at least one coil unit 1500 may be between one or more magnetic circuit units 1600. For example, the at least one coil unit 1500 may be between two or more magnetic circuit units 1600. Also, at least one coil unit 1500 may be disposed in correspondence with two or more magnetic circuit units 1600. Also, one or more coil units 1500 may be arranged as a zigzag type. For example, one or more coil units 1500 may be arranged as a zigzag type in a center of each of the plurality of magnetic circuit units 1600.

The magnetic circuit unit 1600 may be disposed to have a polarity opposite to that of the coil unit 1500. Also, the magnetic coil unit 1600 corresponding to one coil unit 1500 may be provided in plurality. Also, the coil unit 1500 may include two magnetic pairs in opposite directions (for example, directions of currents), and thus, may have a magnetic pair where the directions of the currents are symmetrical. For example, a coil unit 1500 corresponding to three magnetic circuit units 1600 may be configured with a magnetic pair where directions of magnetic currents are symmetrical. Also, the coil unit 1500 may be configured with two magnetic pairs, based on three magnetic circuit units 1600. Also, one coil unit 1500 may be disposed to share three magnetic circuit units 1600.

Five magnetic circuit units 1600 and two coil units 1500 may be provided as one array. The display panel 100 may be vibrated by the array to generate sound. Therefore, when five magnetic circuit units 1600 and two coil units 1500 are provided as one array, the structure may be disposed in each of a left region and a right region of a rear surface of the display panel 100, or may be disposed in each of an upper region and a lower region of the rear surface of the display panel 100. In this case, a 2.0-channel sound may be output to a front portion of the display panel 100. For example, sound having a middle-high-pitched sound band may be output. Here, a middle-pitched sound band may be 200 Hz to 3 kHz, and a high-pitched sound band may be 3 kHz or more. However, embodiments are not limited thereto. Also, a low sound speaker may be provided in a center region of the display panel 100, for outputting a low-pitched sound. When the low sound speaker is provided in the center region of the display panel 100, a low-pitched sound band may be 400 Hz to 1 kHz, but embodiments are not limited thereto. Also, when the low sound speaker is provided under the display panel 100, the low-pitched sound band may be 200 Hz or less, but embodiments are not limited thereto. Accordingly, when the low sound speaker is provided, a 2.1-channel sound may be output to the front portion of the display panel 100.

Moreover, when five magnetic circuit units 1600 and two coil units 1500 are provided as one array and the one array is disposed in each of the left region and the right region, or the upper region and the lower region of the rear surface of the display panel 100, a partition may be between arrays in the left region and the right region or the upper region and the lower region. The partition may be an air gap or a space where sound is generated when the display panel 100 is vibrated by the array. An air gap or a space that generates or transfers sound may be referred to as a partition. A partition may be referred to as an "enclosure" or a "baffle," but the embodiments are not limited to these terms. Sounds having different middle-high-pitched sound bands may be output from the left region and the right region, or the upper region and the lower region, and a stereo sound may be output through left-right sound separation. The partition may be formed of polyurethane, polyolefin, polyethylene, and/or the like, but embodiments are not limited thereto. Also, the partition may include a single-sided tape, a double-sided tape, an adhesive, a bond, and/or the like, and for example, may be formed of a material having elasticity that may be compressed to some extent.

Moreover, the display panel 100 may be vibrated by the sound generation device 2000 including the magnetic circuit unit 1600 and the coil unit 1500 to output sound to a front portion of the display panel 100. Also, the sound generation device 2000 according to an embodiment of the present disclosure may use the display panel 100 as a vibration plate, and thus, may generate sound even without including a separate vibration plate.

Figure 5A:
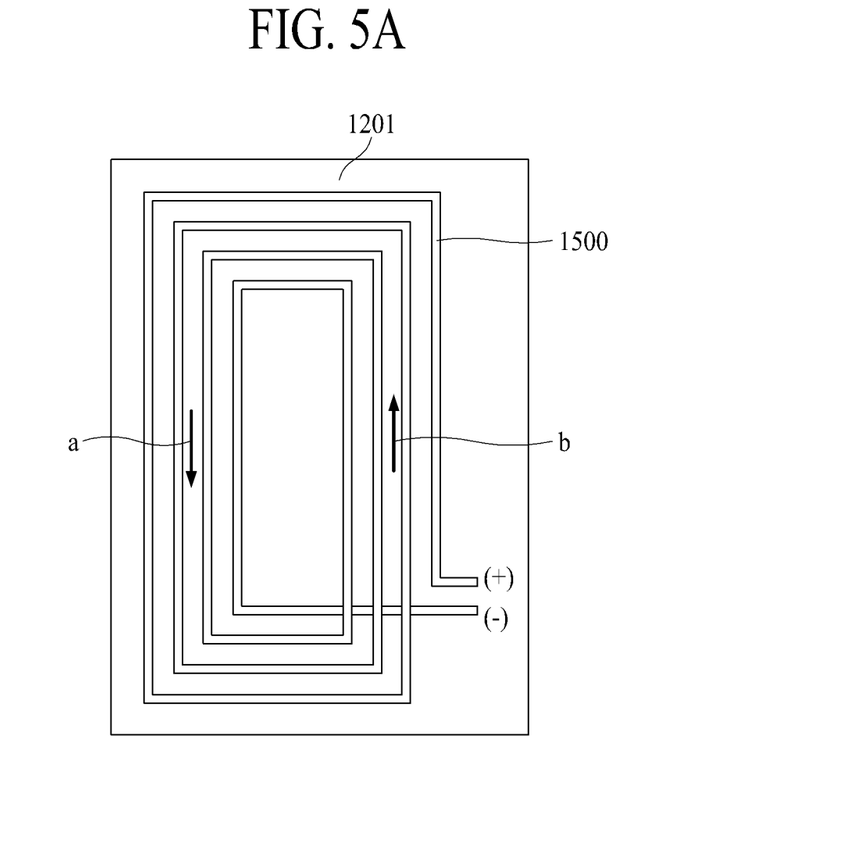
FIGS. 5A and 5B illustrate a coil unit of FIG. 4.
Figure 5B:
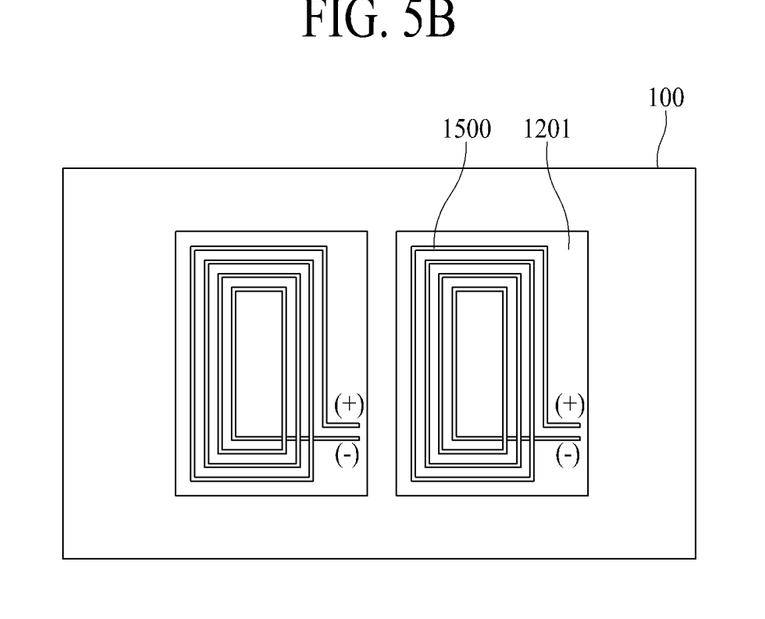

FIGS. 5A and 5B illustrate a coil unit of FIG. 4.

With reference to FIG. 5A, an example where a coil unit 1500 is disposed in one direction on a circuit board 201 is illustrated. The present embodiment of the present disclosure may be applied to a coil unit illustrated in FIG. 8. When a current is applied to the coil unit 1500, the current may flow in a direction 'a' that is a first direction, and the current may flow in a direction 'b' that is opposite to the first direction.

With reference to FIG. 5B, an example where a plurality of coil units 1500 are disposed is illustrated. The plurality of coil units 1500 may be provided to have an array structure. The plurality of coil units 1500 may be disposed on a circuit board 1201. Also, when the plurality of coil units 1500 are provided, a magnetic force between adjacent coil units 1500 may be enhanced, and thus, a driving force of the display panel 100 may be enhanced.

Moreover, one or more coil units 1500 may be provided in a tetragonal shape, based on a shape of each of one or more magnetic circuit units 1600, and thus, a sound generation device may be easily disposed in a display panel.

Figure 6:
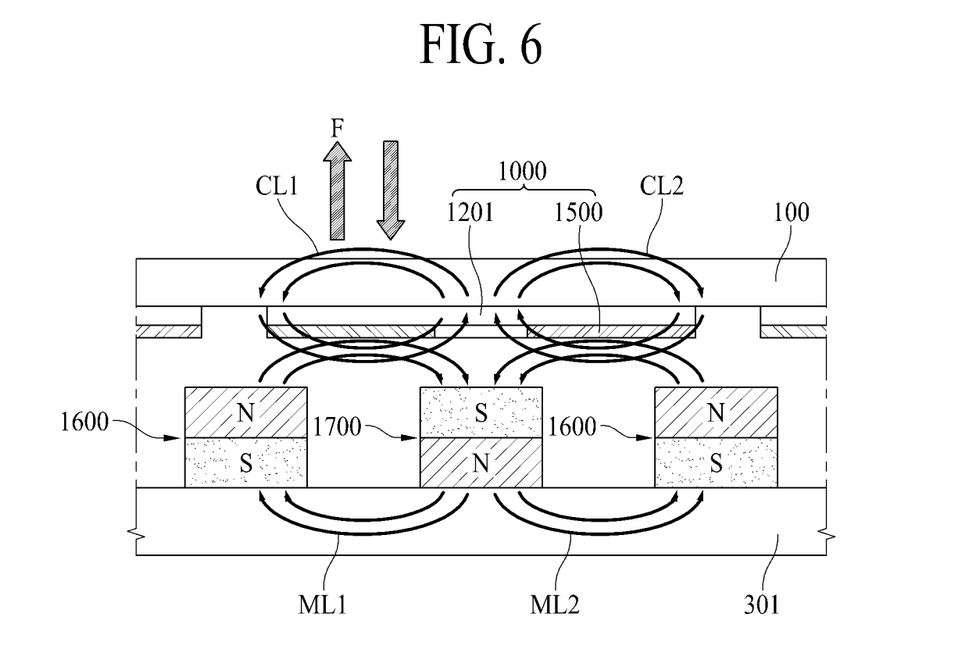
FIG. 6 illustrates an operation of generating sound using a sound generation device according to an embodiment of the present disclosure.

FIG. 6 illustrates an operation of generating sound using a sound generation device according to an embodiment of the present disclosure. An operation of generating sound using the sound generation device of FIGS. 1 and 4 will be described below with reference to FIG. 6. In description below, an operation of generating sound will be described with reference to FIG. 4 for example, and FIG. 1 may also be substantially similarly applied.

With reference to FIG. 6, a coil assembly 1000 may be on a rear surface of a display panel 100. The coil assembly 1000 may be a coil unit 1500 on a circuit board 1201. Also, a magnetic circuit unit 1600 may be in a supporting member 301. For example, the magnetic circuit unit 1600 and a second magnetic circuit unit 1700 may be in the supporting member 301.

When a current is applied to the magnetic circuit unit 1600 and the second magnetic circuit unit 1700, a first magnetic circuit generation magnetic loop ML1 may be formed between the magnetic circuit unit 1600 and the second magnetic circuit unit 1700. Also, a first coil generation magnetic loop CL1 having a direction opposite to that of the first magnetic circuit generation magnetic loop ML1 may be formed in the coil unit 1500 disposed between the magnetic circuit unit 1600 and the second magnetic circuit unit 1700. For example, the first magnetic circuit generation magnetic loop ML1 may be formed clockwise, and the first coil generation magnetic loop CL1 may be formed in a direction opposite to that of the first magnetic circuit generation magnetic loop ML1. Also, a second magnetic circuit generation magnetic loop ML2 having a direction opposite to that of the first magnetic circuit generation magnetic loop ML1 may be formed between the second magnetic circuit unit 1700 and an adjacent magnetic circuit unit 1600, and a second coil generation magnetic loop CL2 having a direction opposite to that of the second magnetic circuit generation magnetic loop ML2 may be formed in the coil unit 1500. Also, the second coil generation magnetic loop CL2 may be formed in a direction opposite to that of the first coil generation magnetic loop CL1. Therefore, two magnetic loops may be symmetrically provided. For example, a magnetic loop of the coil unit 1500 may be formed in a direction opposite to that of a magnetic loop of the magnetic circuit unit 1600.

When the coil unit 1500 generates magnetic lines of force having the same polarity according to an electromagnet effect, repulsion or an attractive force may be generated between the magnetic circuit unit 1600 in the supporting member 301 and the coil unit 1500 in the display panel 100, and the display panel 100 may be upwardly and downwardly vibrated by the repulsion or the attractive force. Sound may be generated by the up-and-down vibration of the display panel 100. For example, a driving force F may be generated by two magnetic loops formed in the coil unit 1500 and the magnetic circuit unit 1600. The display panel 100 may be vibrated by the driving force F to generate sound. Also, the driving force F may be generated in a vertical direction of the coil unit 1500. Because the driving force F is generated in the vertical direction of the coil unit 1500, sound may be output to a front portion of the display panel 100.

Therefore, in an embodiment of the present disclosure, the display panel 100 may be vibrated by one or more magnetic circuit units 1600 for generating a magnetic loop and one or more coil units 1500 between magnetic circuit units 1600, thereby generating sound.

Figure 7:
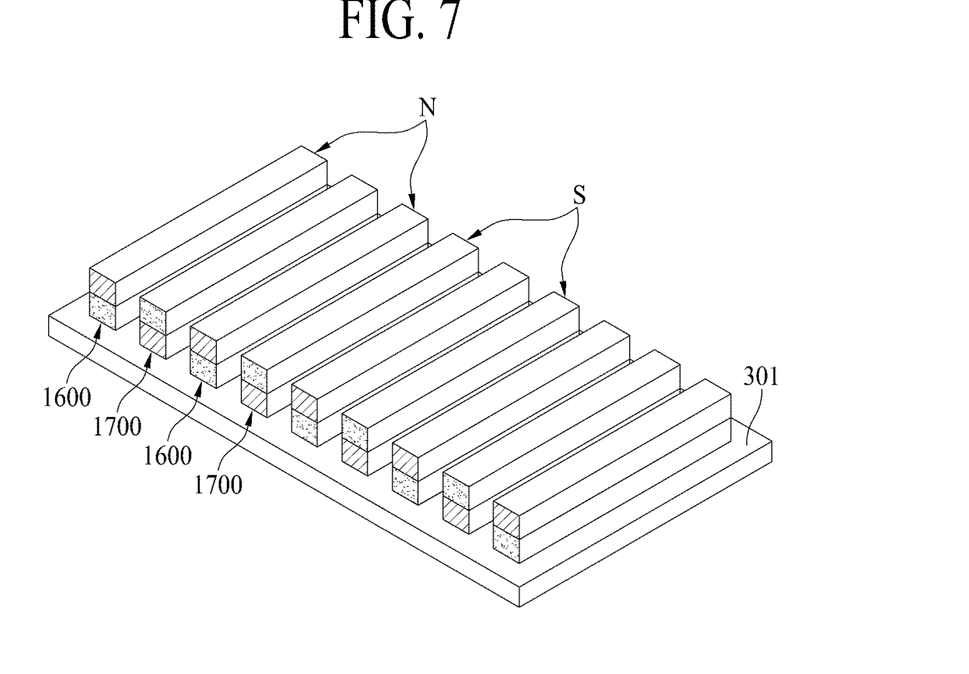
FIG. 7 illustrates a magnetic circuit unit according to another embodiment of the present disclosure.

FIG. 7 illustrates a magnetic circuit unit according to another embodiment of the present disclosure.

With reference to FIG. 7, the magnetic circuit unit 1600 may be in a supporting member 301. The magnetic circuit unit 1600 may have a polarity opposite to that of a second magnetic circuit unit 1700 adjacent thereto, and the magnetic circuit unit 1600 and the second magnetic circuit unit 1700 may be alternately disposed. For example, when a magnet of the magnetic circuit unit 1600 is disposed as an N-pole and an S-pole, a magnet of the second magnetic circuit unit 1700 adjacent to the magnetic circuit unit 1600 may be disposed as an S-pole and an N-pole.

Figure 8:
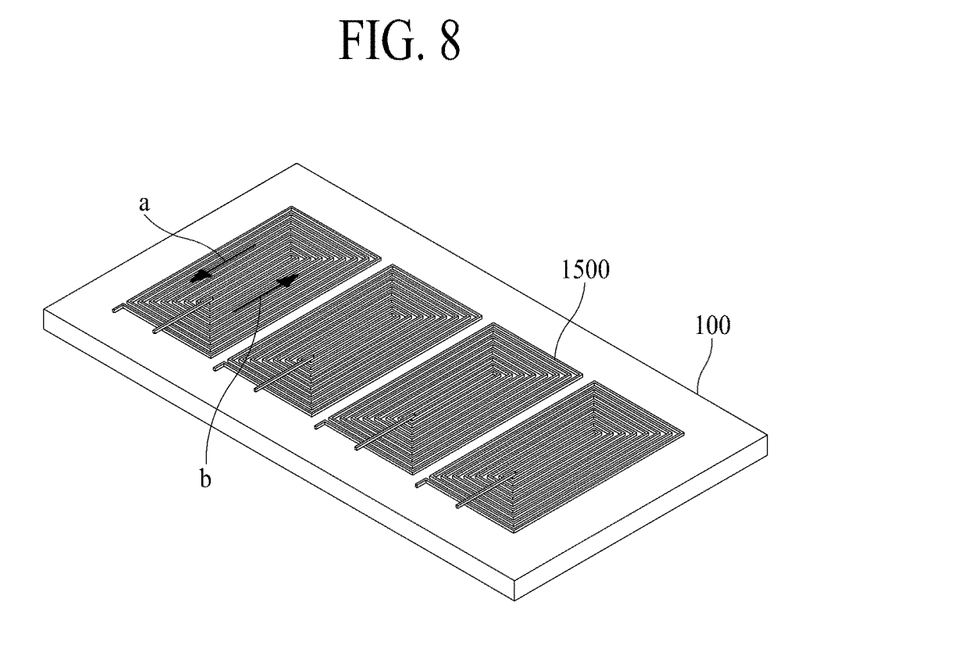
FIG. 8 illustrates a coil unit according to another embodiment of the present disclosure.

FIG. 8 illustrates a coil unit according to another embodiment of the present disclosure.

With reference to FIG. 8, the coil unit 1500 may be disposed in a display panel 100. The coil unit 1500 may be on a circuit board. For example, the coil unit described above with reference to FIGS. 5A and 5B may be disposed. When a current is applied to the coil unit 1500, the current may flow in a direction 'a' that is a first direction, and the current may flow in a direction 'b' that is opposite to the first direction.

Figure 9:
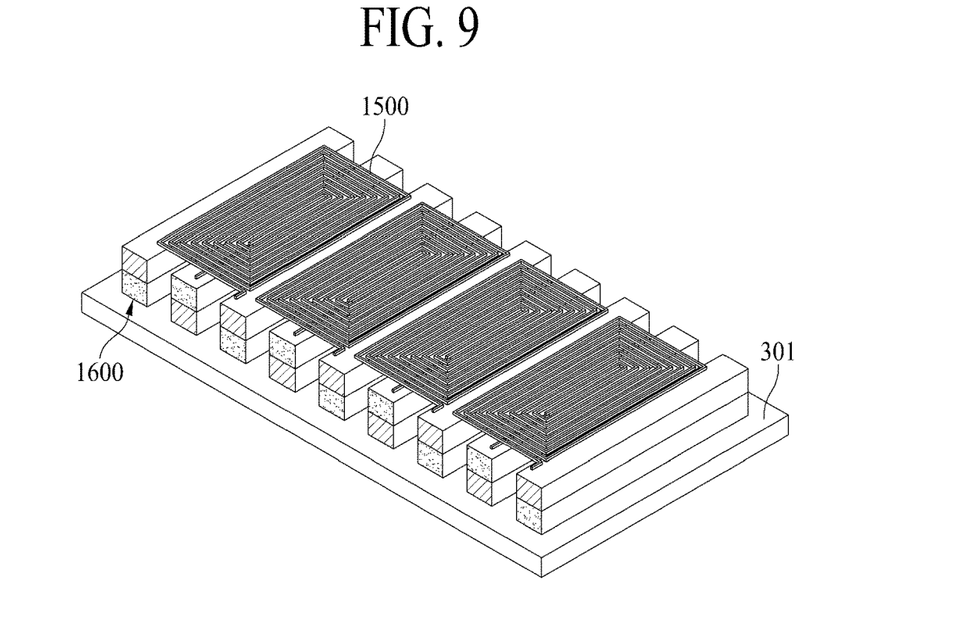
FIG. 9 illustrates positions of a magnetic circuit unit and a coil unit according to another embodiment of the present disclosure.

FIG. 9 illustrates positions of a magnetic circuit unit and a coil unit according to another embodiment of the present disclosure.

With reference to FIG. 9, an example where the coil unit 1500 and the magnetic circuit unit 1600 of FIGS. 7 and 8 are disposed is illustrated. The magnetic circuit unit 1600 may be in a supporting member 301. Also, a coil unit included in a coil assembly 1000 may be on a circuit board.

One coil unit 1500 may be disposed to share three magnetic circuit units 1600. Also, one or more coil units 1500 may be provided in a tetragonal shape, based on a shape of each of one or more magnetic circuit units 1600, and thus, a sound generation device may be easily disposed in a display panel.

Figure 10:
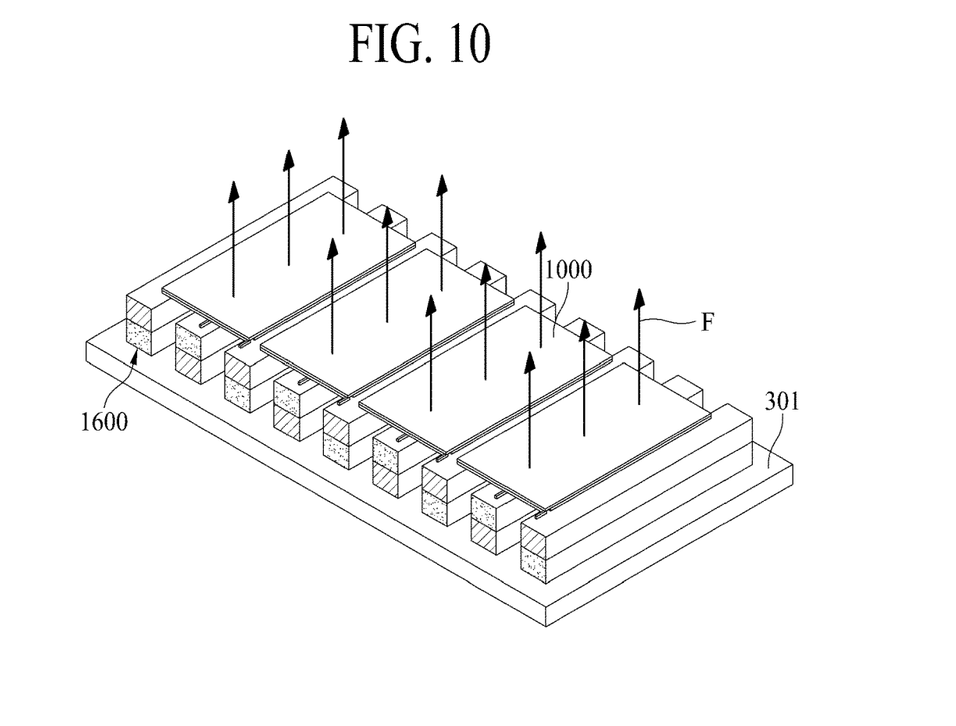
FIG. 10 illustrates positions of a magnetic circuit unit and a coil assembly according to another embodiment of the present disclosure.

FIG. 10 illustrates positions of a magnetic circuit unit and a coil assembly according to another embodiment of the present disclosure.

With reference to FIG. 10, a magnetic circuit unit 1600 may be in a supporting member 301, and a coil assembly 1000 may be on a magnetic circuit unit 1600. The coil assembly 1000 may include a coil unit on a circuit board. Also, one coil unit 1500 included in the coil assembly 1000 may be disposed to share three magnetic circuit units 1600. Also, a driving force F may be generated by the magnetic circuit unit 1600 and the coil assembly 1000. The driving force F may be generated in a vertical direction of the coil assembly 1000, and thus, sound may be output to a front portion of a display panel.

One or more magnetic circuit units 1600 may be configured in a circular shape, a ring shape, or a tetragonal shape. Also, one or more coil units 1500 may be provided in a tetragonal shape, based on a shape of each of one or more magnetic circuit units 1600, and thus, a sound generation device may be easily disposed in a display panel.

The display panel including a sound generation device according to an embodiment of the present disclosure may use all types of display panels, such as a liquid crystal display panel, an organic light emitting diode (OLED) display panel, and an electroluminescent display panel, and embodiments are not limited to a display panel that is vibrated by the sound generation device according to the present disclosure to generate sound. Also, the sound generation device according to an embodiment of the present disclosure may be applied to a display panel including an organic light emitting layer, a quantum dot light emitting layer, and a micro light emitting diode.

Moreover, the sound generation device according to an embodiment of the present disclosure may be applied as a sound generation device provided in a display device. The display device according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display devices, TVs, wall paper display devices, signage devices, game machines, notebook computers, monitors, cameras, camcorders, home appliances, etc.

A display apparatus according to an embodiment of the present disclosure will be described below.

A display apparatus according to an embodiment of the present disclosure comprises a display panel configured to display an image; a supporting member on a rear surface of the display panel; a magnetic circuit unit in the supporting member, the magnetic circuit unit configured to generate a magnetic loop; and a coil unit on the rear surface of the display panel, wherein the magnetic circuit unit and the coil unit are configured to vibrate the display panel to generate sound.

According to some embodiments of the present disclosure, the magnetic circuit unit may include a plurality of magnetic circuit units, each configured to generate a respective magnetic loop, the coil unit may include a plurality of coil units, each between a respective magnetic loop of a respective magnetic circuit unit, and each magnetic circuit unit may have a polarity opposite to a polarity of an adjacent magnetic circuit unit.

According to some embodiments of the present disclosure, each coil unit may have a polarity opposite to a polarity of an adjacent coil unit, and each coil unit includes at least one winding.

According to some embodiments of the present disclosure, the magnetic circuit unit may define a plane parallel to the display panel.

According to some embodiments of the present disclosure, the coil unit may define a plane parallel to a plane defined by the magnetic circuit unit.

According to some embodiments of the present disclosure, the magnetic circuit unit may include a plurality of magnetic circuit units, each configured to generate a respective magnetic loop, the coil unit includes a plurality of coil units, each between a respective magnetic loop of a respective magnetic circuit unit, and each coil unit is between two or more magnetic circuit units.

According to some embodiments of the present disclosure, the magnetic circuit unit may include a plurality of magnetic circuit units each configured to generate a respective magnetic loop, the coil unit may include a plurality of coil units, each between a respective magnetic loop of a respective magnetic circuit unit, and each coil unit may be in correspondence with two or more magnetic circuit units.

According to some embodiments of the present disclosure, one coil unit may be in correspondence with three magnetic circuit units, and the one coil unit corresponding to the three magnetic circuit units may comprise a magnetic pair in which directions of magnetic current are symmetrical.

According to some embodiments of the present disclosure, the coil unit may have one of a circular shape and a tetragonal shape.

According to some embodiments of the present disclosure, the magnetic circuit unit may include a plurality of magnetic circuit units, each configured to generate a respective magnetic loop, the coil unit may include a plurality of coil units, each between a respective magnetic loop of a respective magnetic circuit unit, and each coil unit may be is configured to generate a magnetic loop having a direction opposite to a direction of a magnetic loop of a respective magnetic circuit unit.

According to some embodiments of the present disclosure, a driving force may be generated between the magnetic circuit unit and the coil unit with a direction perpendicular to a plane defined by the coil unit.

According to some embodiments of the present disclosure, the magnetic circuit unit may include a first permanent magnet and a second permanent magnet surrounding the first permanent magnet, such that the polarities of the first and second permanent magnets are oriented in opposite directions to generate the magnetic loop.

According to some embodiment of the present disclosure, the coil unit may be in a zigzag type.

A display apparatus according to an embodiment of the present disclosure comprises a display panel configured to display an image; a supporting member on a rear surface of the display panel; a coil unit between the display panel and the supporting member; and a magnetic circuit unit between the display panel and the supporting member, wherein the coil unit defines a plane parallel to the display panel, and wherein a driving force between the magnetic circuit unit and the coil units is configured to vibrate the display panel to generate sound.

According to some embodiments of the present disclosure, the coil unit may be on the rear surface of the display panel, and the magnetic circuit units may be on the supporting member.

According to some embodiments of the present disclosure, a driving force may be between the magnetic circuit unit and the coil unit, and wherein the driving force has a direction perpendicular to a plane defined by the coil unit.

According to some embodiments of the present disclosure, the magnetic circuit unit may include a plurality of magnetic circuit units, each configured to generate a respective magnetic loop, the coil unit may include a plurality of coil units, each between a respective magnetic loop of a respective magnetic circuit unit, and each magnetic circuit unit may have a polarity opposite to a polarity of an adjacent magnetic circuit unit.

According to some embodiments of the present disclosure, the magnetic circuit unit may include a plurality of magnetic circuit units, each configured to generate a respective magnetic loop, the coil unit may include a plurality of coil units, each between a respective magnetic loop of a respective magnetic circuit unit, each coil unit may be between two or more magnetic circuit units, and each coil unit may be further configured to generate a magnetic loop having a direction opposite to a direction of a magnetic loop of a respective magnetic circuit unit.

According to some embodiments of the present disclosure, the coil unit may define a plane parallel to a plane defined by the magnetic circuit unit.

According to some embodiments of the present disclosure, the magnetic circuit unit may include a plurality of magnetic circuit units, each configured to generate a respective magnetic loop, the coil unit may include a plurality of coil units, each between a respective magnetic loop of a respective magnetic circuit unit, and one of the coil units may be configured to correspond to three of the magnetic circuit units.

As described above, since the display apparatus according to embodiments of the present disclosure includes the sound generation device that vibrates the display panel to generate sound, the sound of the display apparatus may be output to a front portion of the display panel. Accordingly, an immersion experience of a viewer who is watching an image displayed by the display apparatus is enhanced.

Moreover, since the display apparatus according to embodiments of the present disclosure includes the sound generation device that vibrates the display panel to generate sound, a speaker may not be provided, and thus, a degree of freedom in design of a set apparatus and disposition of speakers is enhanced.

Moreover, in the display apparatus according to embodiments of the present disclosure, since the coil unit and the magnetic circuit unit are provided between the display panel and the supporting member, a sound generation device capable of being miniaturized may be provided.

It will be apparent to those skilled in the art that various modifications and variations can be made in the display device of the present disclosure without departing from the technical idea or scope of the disclosure. Thus, it is intended that the present disclosure cover the modifications and variations of the disclosure provided they come within the scope of the appended claims and their equivalents.

What is claimed is:
1. A display apparatus, comprising:
a display panel configured to display an image by emitting light;
a supporting member on a rear surface of the display panel;
a magnetic circuit fixed to the supporting member, the magnetic circuit configured to generate a magnetic loop; and
a coil on the rear surface of the display panel,
wherein the magnetic circuit and the coil are configured to vibrate the display panel to generate sound,
wherein the supporting member is a back cover of the display apparatus, and is fixed to and supports the display panel, and
wherein the coil is a flat coil that defines a plane parallel to the display panel.

2. The display apparatus of claim 1, wherein the magnetic circuit includes a plurality of magnetic circuits, each configured to generate a respective magnetic loop,
wherein the coil includes a plurality of coils, each between a respective magnetic loop of a respective magnetic circuit, and
wherein each magnetic circuit has a polarity opposite to a polarity of an adjacent magnetic circuit.

3. The display apparatus of claim 2, wherein each coil has a polarity opposite to a polarity of an adjacent coil, and each coil includes at least one winding.

4. The display apparatus of claim 1, wherein the magnetic circuit defines another plane parallel to the display panel and the plane defined by the coil.

5. The display apparatus of claim 1, wherein the magnetic circuit includes a plurality of magnetic circuits, each configured to generate a respective magnetic loop,
wherein the coil includes a plurality of coils, each between a respective magnetic loop of a respective magnetic circuit, and
wherein each coil is between two or more magnetic circuits.

6. The display apparatus of claim 1, wherein the magnetic circuit includes a plurality of magnetic circuits each configured to generate a respective magnetic loop,
wherein the coil includes a plurality of coils, each between a respective magnetic loop of a respective magnetic circuit, and
wherein each coil is in correspondence with two or more magnetic circuits.

7. The display apparatus of claim 6, wherein one coil is in correspondence with three magnetic circuits, and
wherein the one coil corresponding to the three magnetic circuits comprises a magnetic pair in which directions of magnetic current are symmetrical.

8. The display apparatus of claim 1, wherein the coil has one of a circular shape and a tetragonal shape.

9. The display apparatus of claim 1, wherein the magnetic circuit includes a plurality of magnetic circuits, each configured to generate a respective magnetic loop,
wherein the coil includes a plurality of coils, each between a respective magnetic loop of a respective magnetic circuit, and
wherein each coil is configured to generate a magnetic loop having a direction opposite to a direction of a magnetic loop of a respective magnetic circuit.

10. The display apparatus of claim 1, wherein a driving force is generated between the magnetic circuit and the coil with a direction perpendicular to the plane defined by the coil.

11. The display apparatus of claim 1, wherein the magnetic circuit includes a first permanent magnet and a second permanent magnet surrounding the first permanent magnet, such that the polarities of the first and second permanent magnets are oriented in opposite directions to generate the magnetic loop.

12. The display apparatus of claim 1, wherein the coil is in a zigzag type.

13. The display apparatus of claim 1, wherein the magnetic circuit and the coil are configured to vibrate an active area of the display panel to generate sound, wherein the active area is an area of the display panel that is configured to emit light.

14. The display apparatus of claim 1, wherein the coil is a multi-winding type coil that includes multiple windings that alternate between positive polarity and negative polarity.

15. A display apparatus, comprising:
a display panel configured to display an image by emitting light;
a supporting member on a rear surface of the display panel;
a coil between the display panel and the supporting member; and
a magnetic circuit between the display panel and the supporting member,
wherein the magnetic circuit is fixed to the supporting member,
wherein the coil is a flat coil that defines a plane parallel to the display panel,
wherein a driving force between the magnetic circuit and the coil is configured to vibrate the display panel to generate sound, and
wherein the supporting member is a back cover of the display apparatus, and is fixed to and supports the display panel.

16. The display apparatus of claim 15, wherein the coil is on the rear surface of the display panel.

17. The display apparatus of claim 15, wherein a driving force is between the magnetic circuit and the coil, and wherein the driving force has a direction perpendicular to the plane defined by the coil.

18. The display apparatus of claim 15, wherein the magnetic circuit includes a plurality of magnetic circuits, each configured to generate a respective magnetic loop,
wherein the coil includes a plurality of coils, each between a respective magnetic loop of a respective magnetic circuit, and
wherein each magnetic circuit has a polarity opposite to a polarity of an adjacent magnetic circuit.

19. The display apparatus of claim 15, wherein the magnetic circuit includes a plurality of magnetic circuits, each configured to generate a respective magnetic loop,
wherein the coil includes a plurality of coils, each between a respective magnetic loop of a respective magnetic circuit,
wherein each coil is between two or more magnetic circuits, and
wherein each coil is further configured to generate a magnetic loop having a direction opposite to a direction of a magnetic loop of a respective magnetic circuit.

20. The display apparatus of claim 15, wherein the plane defined by the coil is parallel to another plane defined by the magnetic circuit.

21. The display apparatus of claim 15, wherein the magnetic circuit includes a plurality of magnetic circuits, each configured to generate a respective magnetic loop,
wherein the coil includes a plurality of coils, each between a respective magnetic loop of a respective magnetic circuit, and
wherein one of the coils is configured to correspond to three of the magnetic circuits.

22. The display apparatus of claim 15, wherein the driving force between the magnetic circuit and the coil is configured to vibrate an active area of the display panel to generate sound,
wherein the active area is an area of the display panel that is configured to emit light.

23. The display apparatus of claim 15, wherein the coil is a multi-winding type coil that includes multiple windings that alternate between positive polarity and negative polarity.

* * * * *